(12) United States Patent
Zatloukal

(10) Patent No.: US 7,441,238 B2
(45) Date of Patent: *Oct. 21, 2008

(54) EXTENDABLE COMPILER FRAMEWORK

(75) Inventor: Kevin Zatloukal, Cambridge, MA (US)

(73) Assignee: BEA Systems, Inc., San Jose, CA (US)

( * ) Notice: Subject to any disclaimer, the term of this patent is extended or adjusted under 35 U.S.C. 154(b) by 559 days.

This patent is subject to a terminal disclaimer.

(21) Appl. No.: 10/951,315

(22) Filed: Sep. 27, 2004

(65) Prior Publication Data

US 2005/0044537 A1 Feb. 24, 2005

Related U.S. Application Data

(63) Continuation of application No. 10/782,715, filed on Feb. 19, 2004, now Pat. No. 7,076,772.

(60) Provisional application No. 60/449,991, filed on Feb. 26, 2003.

(51) Int. Cl.
*G06F 9/45* (2006.01)
(52) U.S. Cl. ............... 717/140; 717/141; 717/142; 717/143; 717/145; 717/146; 717/147
(58) Field of Classification Search .......... 717/140–147
See application file for complete search history.

(56) References Cited

U.S. PATENT DOCUMENTS 5,321,841 A 6/1994 East et al. ............... 718/107

(Continued)

FOREIGN PATENT DOCUMENTS

| CA | 2 248 634 | 3/2000 |
|---|---|---|
| WO | WO 99/23558 | 5/1999 |
| WO | WO 00/29924 | 5/2000 |
| WO | WO 01/90884 A2 | 11/2001 |

OTHER PUBLICATIONS

Paul, Laura Gibbons, "RosettaNet: Teaching Business to Work Together", Oct. 1, 1999. http://www.developer.com/sml/article.php/616641.

(Continued)

*Primary Examiner*—Wei Y. Zhen
*Assistant Examiner*—Chih-Ching Chow
(74) *Attorney, Agent, or Firm*—Womble Carlyle Sandridge & Rice, PLLC

(57) ABSTRACT

To meet the current trend in computer programming, a multi-programming-language compiler system is designed to include a compiler framework which creates a general environment in which to carry out compilation and language modules to encapsulate the details of various programming languages. Such a system makes it easy for tool vendors and end users to adapt to a world where computer programs are written in multiple languages. New language modules may be written that add support for new languages to the compiler framework. It may also be possible to extend existing language modules so that a variant on an existing language may be added to the compiler framework. Such a system may also be adapted to permit several different clients to access detailed language information from the compiler framework. These clients may include a standard command-line shell or a sophisticated multi-language integrated development environment.

This description is not intended to be a complete description of, or limit the scope of, the invention. Other features, aspects, and objects of the invention can be obtained from a review of the specification, the figures, and the claims.

12 Claims, 1 Drawing Sheet

U.S. PATENT DOCUMENTS

| | | | |
|---|---|---|---|
| 5,469,562 A | 11/1995 | Saether | 714/20 |
| 5,604,860 A | 2/1997 | McLaughlin et al. | 715/866 |
| 5,630,131 A | 5/1997 | Palevich et al. | 717/108 |
| 5,748,975 A | 5/1998 | Van De Vanter | 715/531 |
| 5,801,958 A | 9/1998 | Dangelo et al. | |
| 5,835,769 A | 11/1998 | Jervis et al. | 717/113 |
| 5,836,014 A | 11/1998 | Faiman, Jr. | |
| 5,862,327 A | 1/1999 | Kwang | 395/200.33 |
| 5,867,822 A | 2/1999 | Sankar | |
| 5,944,794 A | 8/1999 | Okamoto et al. | 709/229 |
| 5,950,010 A | 9/1999 | Hesse | 395/712 |
| 5,961,593 A | 10/1999 | Gabber et al. | 709/219 |
| 5,966,535 A | 10/1999 | Benedikt et al. | |
| 6,012,083 A | 1/2000 | Savitzky et al. | 709/202 |
| 6,016,495 A | 1/2000 | McKeehan et al. | 707/103 R |
| 6,018,730 A | 1/2000 | Nichols et al. | 706/45 |
| 6,023,578 A | 2/2000 | Birsan et al. | 717/105 |
| 6,023,722 A | 2/2000 | Colyer | 709/201 |
| 6,028,997 A | 2/2000 | Leymann et al. | |
| 6,029,000 A | 2/2000 | Woolsey et al. | |
| 6,044,217 A | 3/2000 | Brealey et al. | 717/107 |
| 6,067,548 A | 5/2000 | Cheng | 707/103 |
| 6,067,623 A | 5/2000 | Blakley et al. | 713/201 |
| 6,070,184 A | 5/2000 | Blount et al. | 709/202 |
| 6,092,102 A | 7/2000 | Wagner | |
| 6,119,149 A | 9/2000 | Notani | 709/205 |
| 6,141,686 A | 10/2000 | Jackowski | 709/224 |
| 6,141,701 A | 10/2000 | Whitney | 710/5 |
| 6,148,336 A | 11/2000 | Thomas et al. | |
| 6,185,734 B1 | 2/2001 | Saboff et al. | |
| 6,212,546 B1 | 4/2001 | Starkovich et al. | 709/203 |
| 6,222,533 B1 | 4/2001 | Notani | 345/329 |
| 6,226,675 B1 | 5/2001 | Meltzer et al. | 709/223 |
| 6,230,287 B1 | 5/2001 | Pinard et al. | 714/31 |
| 6,230,309 B1 | 5/2001 | Turner | 717/1 |
| 6,237,135 B1 | 5/2001 | Timbol | 717/1 |
| 6,243,737 B1 | 6/2001 | Flanagan et al. | 709/202 |
| 6,282,711 B1 | 8/2001 | Halpern | 717/11 |
| 6,292,932 B1 | 9/2001 | Baisley et al. | 717/114 |
| 6,311,327 B1 * | 10/2001 | O'Brien et al. | 717/114 |
| 6,324,681 B1 | 11/2001 | Sebesta | 717/1 |
| 6,330,569 B1 | 12/2001 | Baisley et al. | 707/203 |
| 6,334,114 B1 | 12/2001 | Jacobs et al. | 705/26 |
| 6,338,064 B1 | 1/2002 | Ault et al. | 707/9 |
| 6,343,265 B1 | 1/2002 | Glebov et al. | 703/25 |
| 6,349,408 B1 | 2/2002 | Smith | 717/11 |
| 6,353,923 B1 | 3/2002 | Bogle et al. | 717/128 |
| 6,360,358 B1 | 3/2002 | Elsbree et al. | 717/120 |
| 6,367,068 B1 | 4/2002 | Vaidyanathan et al. | |
| 6,377,939 B1 | 4/2002 | Young | 705/34 |
| 6,393,605 B1 | 5/2002 | Loomans | 717/121 |
| 6,408,311 B1 | 6/2002 | Baisley et al. | 707/203 |
| 6,411,698 B1 | 6/2002 | Bauer et al. | 379/207.01 |
| 6,445,711 B1 | 9/2002 | Scheel et al. | 370/402 |
| 6,470,364 B1 | 10/2002 | Prinzing | 715/530 |
| 6,516,322 B1 | 2/2003 | Meredith | 707/102 |
| 6,549,949 B1 | 4/2003 | Bowman-Amuah | 709/236 |
| 6,560,769 B1 | 5/2003 | Moore et al. | 717/100 |
| 6,567,738 B2 | 5/2003 | Gopp et al. | |
| 6,584,454 B1 | 6/2003 | Hummel et al. | 705/59 |
| 6,594,693 B1 | 7/2003 | Borwankar | |
| 6,594,700 B1 | 7/2003 | Graham et al. | 709/230 |
| 6,601,113 B1 | 7/2003 | Koistinen et al. | 719/316 |
| 6,604,198 B1 | 8/2003 | Beckman et al. | 713/167 |
| 6,609,115 B1 | 8/2003 | Mehring et al. | 705/51 |
| 6,615,258 B1 | 9/2003 | Barry et al. | 709/223 |
| 6,636,491 B1 | 10/2003 | Kari et al. | 370/328 |
| 6,637,020 B1 | 10/2003 | Hammond | 717/107 |
| 6,643,652 B2 | 11/2003 | Helgeson et al. | 707/10 |
| 6,654,932 B1 | 11/2003 | Bahrs et al. | 715/507 |
| 6,662,357 B1 | 12/2003 | Bowman-Amuah | |
| 6,678,518 B2 | 1/2004 | Eerola | 455/422.1 |
| 6,684,388 B1 * | 1/2004 | Gupta et al. | 717/136 |
| 6,687,702 B2 | 2/2004 | Vaitheeswaran et al. | |
| 6,687,848 B1 | 2/2004 | Najmi | 714/4 |
| 6,721,740 B1 | 4/2004 | Skinner et al. | |
| 6,721,779 B1 | 4/2004 | Maffeis | 709/202 |
| 6,732,237 B1 | 5/2004 | Jacobs et al. | |
| 6,748,420 B1 | 6/2004 | Quatrano et al. | 709/205 |
| 6,754,884 B1 | 6/2004 | Lucas et al. | 717/108 |
| 6,757,689 B2 | 6/2004 | Battas et al. | |
| 6,789,054 B1 | 9/2004 | Makhlouf | 703/6 |
| 6,795,967 B1 | 9/2004 | Evans et al. | 719/310 |
| 6,799,718 B2 * | 10/2004 | Chan et al. | 235/375 |
| 6,802,000 B1 | 10/2004 | Greene et al. | |
| 6,804,686 B1 | 10/2004 | Stone et al. | |
| 6,823,495 B1 | 11/2004 | Vedula et al. | 715/805 |
| 6,832,238 B1 | 12/2004 | Sharma et al. | 709/201 |
| 6,836,883 B1 * | 12/2004 | Abrams et al. | 717/140 |
| 6,847,981 B2 | 1/2005 | Song et al. | 707/104.1 |
| 6,850,979 B1 | 2/2005 | Saulpaugh et al. | 709/225 |
| 6,859,180 B1 | 2/2005 | Rivera | |
| 6,874,143 B1 | 3/2005 | Murray et al. | 717/173 |
| 6,889,244 B1 | 5/2005 | Gaither et al. | 709/202 |
| 6,915,519 B2 | 7/2005 | Williamson et al. | 719/313 |
| 6,918,084 B1 | 7/2005 | Slaughter et al. | 715/513 |
| 6,920,607 B1 | 7/2005 | Ali et al. | 715/501.1 |
| 6,922,827 B2 | 7/2005 | Vasilik et al. | |
| 6,950,872 B2 | 9/2005 | Todd, II | 709/227 |
| 6,959,307 B2 | 10/2005 | Apte | |
| 6,963,914 B1 | 11/2005 | Breitbart et al. | 709/226 |
| 6,971,096 B1 | 11/2005 | Ankireddipally et al. | 718/101 |
| 6,976,086 B2 | 12/2005 | Sadeghi et al. | 709/236 |
| 7,000,219 B2 * | 2/2006 | Barrett et al. | 717/107 |
| 7,017,146 B2 | 3/2006 | Dellarocas et al. | 717/106 |
| 7,043,722 B2 | 5/2006 | Bau, III | 718/101 |
| 7,051,072 B2 | 5/2006 | Stewart et al. | 709/204 |
| 7,051,316 B2 | 5/2006 | Charisius et al. | 717/103 |
| 7,054,858 B2 | 5/2006 | Sutherland | 707/4 |
| 7,062,718 B2 | 6/2006 | Kodosky et al. | 715/771 |
| 7,069,507 B1 | 6/2006 | Alcazar et al. | 715/530 |
| 7,072,934 B2 | 7/2006 | Helgeson et al. | 709/203 |
| 7,073,167 B2 | 7/2006 | Iwashita | |
| 7,076,772 B2 | 7/2006 | Zatloukal | 717/147 |
| 7,089,584 B1 | 8/2006 | Sharma | |
| 7,096,422 B2 | 8/2006 | Rothschiller et al. | 715/513 |
| 7,107,578 B1 | 9/2006 | Alpern | 717/124 |
| 7,111,243 B1 | 9/2006 | Ballard et al. | 715/744 |
| 7,117,504 B2 * | 10/2006 | Smith et al. | 719/328 |
| 7,127,704 B2 | 10/2006 | Van De Vanter et al. | 717/112 |
| 7,143,186 B2 | 11/2006 | Stewart et al. | 709/245 |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,184,967 B1 | 2/2007 | Mital et al. | 705/8 |
| 7,240,331 B2 | 7/2007 | Vion-Dury et al. | 717/117 |
| 7,260,599 B2 | 8/2007 | Bauch et al. | |
| 7,260,818 B1 | 8/2007 | Iterum et al. | |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Macready et al. | 705/37 |
| 2002/0035604 A1 | 3/2002 | Cohen et al. | |
| 2002/0049788 A1 | 4/2002 | Lipkin et al. | |
| 2002/0073080 A1 | 6/2002 | Lipkin | |
| 2002/0073236 A1 | 6/2002 | Helgeson et al. | |
| 2002/0073396 A1 | 6/2002 | Crupi et al. | |
| 2002/0078365 A1 | 6/2002 | Burnett et al. | 713/200 |
| 2002/0083075 A1 | 6/2002 | Brummel et al. | |
| 2002/0111922 A1 | 8/2002 | Young et al. | |
| 2002/0116454 A1 | 8/2002 | Dyla et al. | |
| 2002/0120685 A1 | 8/2002 | Srivastava et al. | |
| 2002/0143960 A1 | 10/2002 | Goren et al. | |

| | | | |
|---|---|---|---|
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0169644 A1 | 11/2002 | Greene | |
| 2002/0174178 A1 | 11/2002 | Stawikowski | |
| 2002/0174241 A1 | 11/2002 | Beged-Dov et al. | |
| 2002/0184610 A1 | 12/2002 | Chong et al. | |
| 2002/0188486 A1 | 12/2002 | Gil et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau, III et al. | |
| 2003/0014439 A1 | 1/2003 | Boughannam | |
| 2003/0018661 A1 | 1/2003 | Darugar | |
| 2003/0018665 A1 | 1/2003 | Dovin et al. | |
| 2003/0018832 A1 | 1/2003 | Amirisetty et al. | |
| 2003/0018963 A1 | 1/2003 | Ashworth et al. | |
| 2003/0023957 A1 | 1/2003 | Bau et al. | |
| 2003/0028364 A1 | 2/2003 | Chan et al. | |
| 2003/0028579 A1 | 2/2003 | Kulkarni et al. | |
| 2003/0041198 A1 | 2/2003 | Exton et al. | 710/200 |
| 2003/0043191 A1 | 3/2003 | Tinsley et al. | |
| 2003/0046266 A1 | 3/2003 | Mullins | |
| 2003/0046591 A1 | 3/2003 | Asghari-Kamrani et al. | |
| 2003/0051066 A1 | 3/2003 | Pace et al. | |
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0079029 A1 | 4/2003 | Garimella et al. | |
| 2003/0084203 A1 | 5/2003 | Yoshida et al. | |
| 2003/0110117 A1 | 6/2003 | Saidenberg et al. | |
| 2003/0110446 A1 | 6/2003 | Nemer | |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0196168 A1 | 10/2003 | Hu | |
| 2004/0019645 A1 | 1/2004 | Goodman et al. | |
| 2004/0040011 A1 | 2/2004 | Bosworth et al. | |
| 2004/0078373 A1 | 4/2004 | Ghoneimy et al. | |
| 2004/0103406 A1 | 5/2004 | Patel | |
| 2004/0133660 A1 | 7/2004 | Junghubert et al. | |
| 2004/0148336 A1 | 7/2004 | Hubbard et al. | |
| 2004/0204976 A1 | 10/2004 | Oyama et al. | |
| 2004/0216086 A1 | 10/2004 | Bau | |
| 2004/0225995 A1 | 11/2004 | Marvin et al. | |
| 2004/0260715 A1 | 12/2004 | Mongeon et al. | |
| 2005/0050068 A1 | 3/2005 | Vaschillo et al. | |
| 2005/0278585 A1 | 12/2005 | Spencer | |
| 2006/0206856 A1 | 9/2006 | Breeden et al. | |
| 2006/0234678 A1 | 10/2006 | Juitt et al. | |
| 2007/0038500 A1 | 2/2007 | Hammitt et al. | |

OTHER PUBLICATIONS

Mariucci, Marcello. "Enterprise Application Server Development Environments.", Overview. University of Stuttgart. Oct. 10, 2000, p. 1-10.
Sun Microsystems. "IPlanet Application Server 6.0 White Paper.", Technical Reference Guide. May 25, 2000, all, fig. on p. 20.
Roman, Ed and Rickard Oberg, "The Technical Benefits of EJB and J2EE Technologies over COM+ and Windows DNA." Dec. 1999, pp. 3-5, fig. 1.
Hewlett-Packard. "HP Application Server." technical guide version 8.0. 1999-2001, all.
Duvos, Enrique and Azer Bestavros. "An Infrastructure for the Dynamic Distribution of Web Applications and Services." Department of Computer Science, Boston University. Dec. 2000, pp. 4-12.
Kunisetty, Workflow Modeling and Simulation Using an Extensible Object-Oriented Knowledge Base Management System, CiteSeer, 1996, pp. 1-60, entire reference.
Var Der Aalst et al, Verification of XRL: An XML-Based Workflow Language, IEEE, Jul. 2001, pp. 427-432, entire reference.
Blake, Rule-Driven Coordination Agents: A Self-Configurable Agent Architecture for Distributed Control, IEEE, Mar. 2001, pp. 271-277, entire reference.
Dahalin et al, Workflow Interoperability Using Extensible Markup Language (XML), IEEE, Jul. 2002, pp. 513-516, entire reference.
International Search Report, PCT/US04/05488, mailed Mar. 1, 2005, 3 sheets.
IBM TDB, "Abstraction of Remote Operating Systems", Aug. 1, 2001, IP.comm, IP.Comm No. IPCOM000015157D, pp. 1-3.
Erich Liebmann, et al., "Adaptive Data Dissemination and Caching for Edge Service Architectures Built with the J2EE", Mar. 2004, ACM Press, 2004 ACM Symposium on Applied Computing, pp. 1717-1724.
Sosnoski, "XML and Java Technologies: Data Binding, Part 1: Code Generation Approaches—JAXB and More", IBM, Jan. 2003, pp. 1-11; http://www-128.ibm.com/developerworks/library/x-databdopt/index.html.
Kilgore, R.A., Multi-Language, Open-Source Modeling Using the Microsoft.NET Architecture, Proceedings of the Winter Simulation Conference, Dec. 8-11, 2002, © 2006, IEEE, pp. 629-633.
Chen, et al., "eCo Architecture for Electronic Commerce Interoperabillity", CommerceNet Framework Project, Jun. 29, 1999, © 1999 by CommerceNet, Inc., pp. 1-107.
Embury, S.M., et al., "Assisting the Comprehension of Legacy Transactions", Proceedings of the Eighth Working Conference on Reverse Engineering, Oct. 2-5, 2001, © 2001 IEEE, pp. 345-354.
Mays, E., et al., "A Persistent Store for Large Shared Knowledge Bases", IEEE Transactions on Knowledge and Data Engineering, Mar. 1991, vol. 3, Issue 1, © 1991, pp. 33-41.
Tang, C., et al., "Integrating Remote Invocation and Distributed Shared State", Proceedings of the 18th International Parallel and Distributed Processing Symposium, (IPDPS '04), © 2004 IEEE, Apr. 26-30, 2004, 10 pages.
Java Debug Interface-definition, retrieved from <URL http://java.sun.com/j2se/1.4.2/docs/guide/jpda/jdi/overview-summary.html on Feb. 21, 2007, pp. 1-3.
Bogunovic, N., "A Programming Model for Composing Data-Flow Collaborative Applications", R. Boskovic Institute, Zagreb, 10000, Croatia, IEEE, Mar. 1999, 7 pages, retrieved Apr. 10, 2007.
Sung, S.Y., et al., "A Multimedia Authoring Tool for the Internet", © 1997 IEEE, pp. 304-308, retrieved Apr. 10, 2007.
Smith, M., et al., "Marching Towards a Software Reuse Future", ACM Ada Letters, vol. XIV, No. 6, Nov./Dec. 1994, pp. 62-72, retrieved Apr. 10, 2007.
Mohan, C., et al., "Aries: A Transaction Recovery Method Supporting Fine-Granularity Locking and Partial Rollbacks Using Write-Ahead Logging", © 1992, ACM Transactions on Database Systems, vol. 17, No. 1, Mar. 1992, pp. 94-162.
Stylus Studio, "Xquery Mapper", Stylus Studio®, Jun. 5, 2007, pp. 1-6; http://www.stylusstudio.com/xquery_mapper.html.
Altova, "XML-to-XML Mapping", Altova MapForce®, 2007, pp. 1-3.
Jamper, "Jamper-Java XML Mapper", Sourceforge.Net®, Jun. 6, 2007, pp. 1-4; http://jamper.sourceforge.net/.
Bea, "Transforming Data Using Xquery Mapper", Bea AquaLogic Service Bus. 2.0 Documentation, 2006, pp. 1-19.
Alonso, G., et al., "Advanced Transaction Models in Workflow Contexts", Proceedings of the 12th International Conference on Data Engineering, Feb. 1996, retrieved from: http://citeseer.ist.psu.edu/alonso96advanced.html.
Van Der Alst, WMP, et al., "XML Based Schema Definition for Support of Inter-organizational Workflow", University of Colorado and University of Eindhoven report, 2000, retrieved from: http://citeseer.ist.psu.edu/vanderaalst00xml.html.
Plaindoux, D., "XML Transducers in Java", Proceedings of the 11th International World Wide Web Conference, Sheraton Waikiki Hotel, Honolulu, HI, USA, May 2002, retrieved from: http://www2002.org/CDROM/poster/132/index.html.
Supplemental European Search Report, EPO2784131.1-1234—PCT/US0233098, dated Aug. 8, 2007, 4 pages.
Allamaraju, et al., "Professional Java Server Programming J2EE 1.3 Edition", WROX, XP002442953, ISBN: 1-861005-37-7, Sep. 2001, p. 1009-p. 1057.

Sun Microsystems: "J2EE™ Connector Architecture 1.0", XP-002442954, Aug. 2001; retrieved from the Internet: URL: http://java.sun.com/j2ee/connector/download.html>.

Microsoft, "Microsoft.net Framework", Microsoft Corporation, 2001, 54 pages.

Willink, "Meta-Compilation for C ++", University of Surrey, Jan. 4, 2000, 379 pages.

Muller, "Event-Oriented Dynamic Adaptation of Workflows: Model, Architecture, and Implementation", 2002, University of Leipzig, Germany, pp. 1-viv, 1-342.

Peltz, "Web Services Orchestration", HP, Jan. 2003, Hewlett-Packard, Co., pp. 1-20.

Ort et al., "Java Architecture for XML Binding (JAXB)", Sun Microsystems, Inc., Mar. 2003, retrieved from <http://java.sun.com/developer/technical/articles/WebServices/jaxb>, pp. 1-14.

Wikipedia (redirected from JAXB), "Java Architecture for XML Binding (JAXB)", Oct. 12, 2007, pp. 1-3.

Shannon, "Java™ 2 Platform Enterprise Edition Specification, v1.3", Sun Microsystems, Inc., Proposed Final Draft Oct. 20, 2000, Chapters 1-11, 170 pages.

* cited by examiner

EXTENDABLE COMPILER FRAMEWORK

PRIORITY CLAIM AND CROSS-REFERENCES TO RELATED APPLICATIONS

This application is a continuation of U.S. patent application Ser. No. 10/782,715, filed on Feb. 19, 2004 now U.S. Pat. No. 7,076,772 which claimed priority to U.S. provisional patent application No. 60/449,991, filed on Feb. 26, 2003, now abandoned. Priority is claimed to all of the above references. All of the above references are hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This invention relates in general to the field of software systems, specifically software systems for compiling computer programs.

BACKGROUND

A compiler is a computer program that takes as input a computer program written a source language and produces as output an equivalent computer program written in a target language. It may be designed to translate any source language into any target language. Many compilers, however, are designed to accept only one source and one target language. The source and target languages of these compilers are selected when the compiler is first written. Changing them is nearly impossible and would require a rewrite of virtually the entire compiler.

Recent trends in the computer industry have been towards more complicated computer programs, often written in multiple computer languages. Furthermore, multiple computer languages might appear in a single source file, often with one language nested inside another. Traditional multiple language compilers are not sufficient to deal with this problem. Some of them were designed to deal with multiple languages in a single source file in limited examples, but none of them deal with the problem in a general way. Furthermore, such compilers cannot be easily extended to support new languages or new combinations of languages in a source file.

The demands on compilers are increasing in other ways as well. In the past a compiler was designed to serve a single client, typically command line interface, to perform batch compilation of a group of files. Modern compilers are facing more diverse clients which require far more detailed information from compiler. These clients include the traditional batch mode user interfaces as well as integrated development environments.

DETAILED DESCRIPTION

Figure 1:
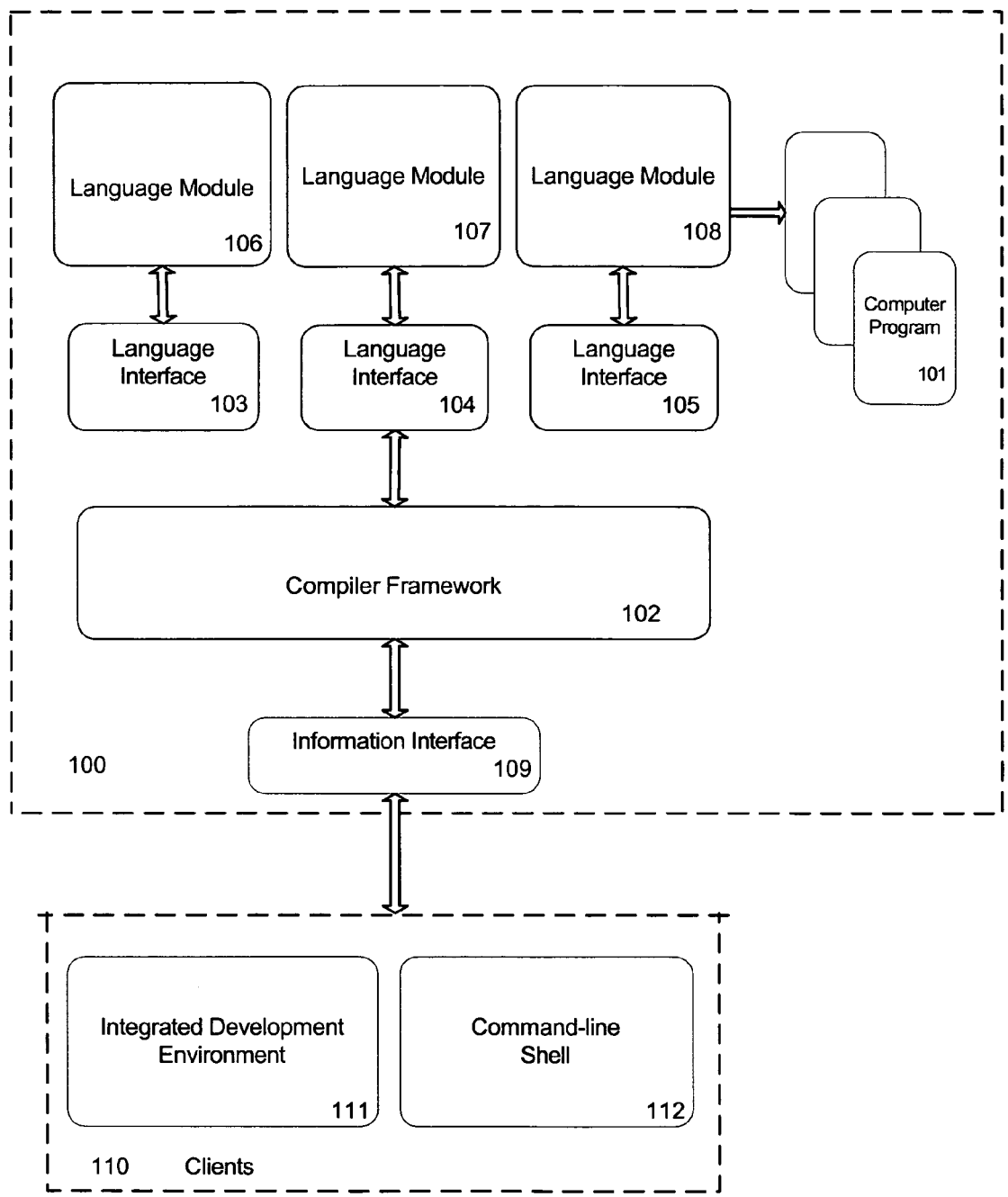
FIG. 1 is a diagram showing a multi-programming-language compiler system that can be used in accordance with one embodiment of the present invention.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

One embodiment of the present invention provides a system and method for creating a compiler system 100 as shown in FIG. 1 that allows the compilation of multiple languages written in a computer program 101 and can be easily extended to add new languages. It consists of a compiler framework 102, which creates a general environment in which to carry out compilation, a plurality of language modules such as 106-108 to encapsulate the details of various programming languages, and a plurality of language interfaces such as 103-105 provided by each language module to interact with the compiler framework. In order to compile a program, the compiler framework and the language modules operate together to execute the compilation process. The compiler framework controls the compilation process and performs a standard language-independent portion of the compilation process and each language module provides a language-dependent portion of the compilation process for a particular programming language. Such a system makes it easy for tool vendors and end users to adapt to a world where computer programs are written in multiple languages. New language modules may be written that add support for new languages to interact with the compiler framework. It may also be possible to extend existing language modules so that a variant on an existing language may be added to the compiling system.

One embodiment of the present invention may be adapted to permit one or more clients to interact with the compiler system through an information interface 110 in order to request services and obtain detailed language information from the compiler framework. These clients may include a standard command-line shell 112 or a sophisticated multi-language integrated development environment (IDE) 111. Information from the language modules and the compiler framework may be passed through to the various clients in a language-neutral way.

Compiler Framework

The compiler framework in accordance with one embodiment of the present invention is responsible for performing services that are not highly specific to any one programming language in the computer program. In some embodiments of this invention the compiler framework may be tailored for a particular environment such as the Java® environment. In such a circumstance, the compiler framework may provide services that are more useful for Java®-like programming language, but it does not mean that the compiler framework will become language-dependent.

In one embodiment, a computer program that is compiled by the compiler system may be organized into projects. A project may include at least one set of files, paths, libraries, configuration information, and dependencies of files. Such information may be maintained and used by the compiler framework to direct the compilation process. In an embodiment in the Java® environment a project might include a list of class files, Java® files, JAR files, and a set of Java® classpaths.

In one embodiment the compiler framework is responsible for controlling the overall compilation process for a computer program. The phases of the compilation process may be defined by the compiler framework and may include scanning, parsing, name resolution, semantic checking, and code generation. The compiler framework may control the invocation of these phases by calling functions on an interface provided by the language modules.

The compiler framework in accordance with one embodiment of the present invention may maintain a type cache to store types defined in the files of the project. This type cache may allow types defined in different languages to be intermixed and may allow types defined in one programming language to reference types defined in another programming language. In an embodiment for the Java® environment, this type cache may maintain a hierarchical structure mirroring the package structure of the Java® project. The type cache may also requires types defined in different programming languages to be mapped to the type system of one particular programming language, such as the Java® programming language. In one embodiment, the type cache may contain all the public information about a particular source file so that another source file may be type checked using only the information contained in the type cache.

A type cache may also store dependencies between the types it stores. A dependency represents the fact that one type may depend in some way on the structure of another type. The compiler framework may also maintain a list of reverse dependencies, making it efficient to determine what other types may be affected if a particular type is changed. The type cache may be serialized to disk so that it does not have to be regenerated when the compiler framework is shut down and restarted.

The compiler framework may also include a list of errors. In embodiments that organize computer programs into projects and files, the set of errors may include errors for the entire project and errors for each source file in the project. The errors may also include one or more suggestions for correcting the errors, which may be provided by the language modules or the compiler framework.

The compiler framework in accordance with one embodiment of the present invention may also provide a multi-threading service which may be used by the compiler framework and the language modules. The multi-threading service may include a thread pool with multiple worker threads capable of being assigned to independent tasks. The multi-threading service may also include a facility for including dependencies between the worker threads so that one worker thread may wait on the completion of a second worker thread.

While the compiler framework is programming language independent, it may be tailored for a particular programming language environment. In one embodiment, the compiler framework may be tailored to the Java® programming environment. In this embodiment, the compiler framework may organize use a project system that includes the Java® package structure. The compiler framework may also utilize a Java®-like type system for all its programming languages. The framework may also provide a module for code generation that uses Java® as an intermediate language.

Language Interface

In one embodiment, the compiler framework may interact with a particular language module through a standard language interface that every language module must implement. This interface might provide functions allowing the compiler framework to access various components that perform different phases of compilation and it may also allow the compiler framework to get language specific information about the source files that have been compiled.

In one embodiment, the language interface may present the language-dependent portion of the compilation process in the form of a set of components, each component performing one of the standard phases of compilation. These phases may include a scanning phase, a parsing phase, a name resolution phase, a semantic checking phase, and a code generation phase.

In one embodiment, the language interface allows one language module to interact with another language module to provide services for compilation of nested languages. Language nesting occurs when a section of source code written in an inner language appears within the source code of an outer language. One family of nested languages consists of the Java® annotation languages, where Java® is the outer language and the inner language appears within Java® comments. The language interface allows one language module to invoke another language module in order to compile a nested language. The outer language may identify the start of a nested language using any information generated during compilation or it may allow the inner language to make the determination. Either the inner or the outer language may determine where the nested language ends.

In one embodiment, the language interface may include functions for retrieving information about a particular source file. These interfaces may provide various types of information that can be used by various clients of the compiler framework. In an embodiment where an integrated development environment (IDE) is a client of the compiler framework, this information may be useful for providing various editing features for the language. In such an embodiment this information may include: information about matching tokens, the list of tokens for a particular source file or a particular portion of a source file, code completion information, or language nesting information.

Language Modules

A language module is the mechanism by which the compiler framework is extended. A language module should encapsulate the knowledge about a particular programming language and present a standard language interface to the compiler framework. A language module controls the portions of the compilation process that require specific knowledge of a programming language. Language modules may be provided by the developer of the compiler framework, by independent vendors, or by an end user.

In one embodiment, one of the language modules might be a language module for the Java® language. This Java® language module would include several components which have specific knowledge of the Java® language. These components might include: a scanner, a parser, a name resolver, a semantic checker, and a code generator each of which has a detailed understanding of part of the structure of the Java® language. These components would be invoked by the compiler framework in the necessary order to perform compilation of a Java® file.

In one embodiment, one language module may be able to extend another language module in order to easily create a new programming language. For instance, a language like Java® could be given extra semantics that are not present in the original language. In embodiments where the language modules provide separate components for each phase of compilation such a language could be implemented by extending the components for various phases of compilation and reusing components that don't require changes. Such a facility might also be useful for implementing the multitude of languages related to XML. XML languages usually preserve the basic syntax of XML but add extra semantic requirements. These languages can be implemented quickly and still benefit from the facilities based on the XML language module.

In one embodiment the invention may include tools to speed the development of language modules. These tools may automate the creation of common tasks. In particular automatic generators are common in the art for both parsers and scanners and these tools can make the development of simple languages very rapid. Scanner generators are given a lexical specification, which defines the types of tokens allowed in a particular language and produce code for generating scanners. Likewise, parser generators take a grammar for a programming language and produce a parser that recognizes that grammar. Tools provided with the compiler framework may automatically create components that are compatible with the compiler framework and provide proper interfaces on those components. Tools provided with the compiler framework may also implement robust error correction mechanisms so that the created language modules are suitable for use with all clients.

Clients

The compiling system may provide interfaces to provide services and information to various clients. A client may require information about a particular source file or a project. A client may also invoke the compilation of a particular source file or an entire project. A client may also wish to change source files and notify the compiler framework that the source files have changed.

In one embodiment the client may be an integrated development environment (IDE) which allows a developer to work on a project. These facilities may rely on the compiler network to obtain information about the project. The IDE may include facilities for examining the contents of a project, including browsing the files in a project or browsing the class hierarchy in the project. The IDE may also include an error display for showing the errors in the project.

In an embodiment that includes an IDE, the IDE may include a source code editor that allows the user to edit source files that are part of the project. The source code editor may wish to request language information about various portions of the source code from the compiling system. This information may be provided by the compiler framework or by the language modules directly.

A source code editor in an IDE may be adapted to edit source files containing nested languages. The source code editor may request information about the start and end of nested languages from the compiler framework, as well as information about the various different languages in the source file.

In an interactive embodiment, the compiler framework might provide an interface allowing clients to inform the compiler framework that the files in the project have changed. The compiler framework may subsequently recompile the changed files and any files that depend on them, by obtaining dependency information from the type cache which may be maintained by the compiler framework.

In another embodiment the client may be a command-line shell. This shell may request that the compiler framework compile a set of files and produce an executable or a library. If the compilation fails, the shell may request a list of errors from the compiler framework so it can display them to the user on the console.

According to the teachings of the present invention, a software system is created that allows for a compiler that supports both multiple languages and multiple clients. The present system allows for the relatively easy addition of support for new programming languages. Such a system allows for the creation of a flexible development environment that is suitable to the needs of modern programmers who are often working in multiple programming languages and frequently end up creating new programming languages in order to satisfy the requirements of their current project.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for performing a compilation process on a computer program, the method comprising:

initializing a compiler framework, a programming language-independent portion of the compilation process that:

controls overall compilation process of the computer program; and maintains a type cache to store types defined, wherein the type cache allows types defined in different programming languages to be intermixed;

invoking through a language interface a first language module to perform programming language-dependent analysis of the computer program;

retrieving language-specific information about the computer program from the language interface;

interacting between the first language module and a second language module through the language interface, wherein the second language is a nested language in the first language;

invoking through the first language interface the first language module to perform code generation for the computer program;

providing compilation result to one or more clients based on at least one of the analysis and the code generation.

2. The method of claim 1 wherein:

the language interface includes functionality to request the compilation of a specified portion of the computer program using the second language module.

3. The method of claim 1 wherein:

the programming language-dependent analysis of the computer program includes at least one of: lexical analysis, syntactic analysis, name resolution, semantic analysis, and code generation.

4. The method of claim 1, wherein the programming language-independent portion of the compilation process includes at least one of:

managing a set of files involved in the compilation process;

persisting a set of paths involved in the compilation process;

maintaining a set of dependencies for the compilation process;

maintaining at least one namespace for storing a plurality of names used in the computer program;

acquiring configuration information; and maintaining a list of errors related to the computer program.

5. The method of claim 1 wherein:

the computer program is written in the Java® programming language.

6. The method of claim 1, further comprising:

extending a second language module with the first language module in order to create a new programming language.

7. A machine readable medium having instructions stored thereon to cause a system to:

initializing a compiler framework, a programming language-independent portion of the compilation process that:

controls overall compilation process of the computer program; and maintains a type cache to store types defined, wherein the type cache allows types defined in different programming languages to be intermixed;

invoke through a language interface a first language module to perform programming language-dependent analysis of the computer program;

retrieve language-specific information about the computer program from the language interface;

interact between the first language module and a second language module through the language interface, wherein the second language is a nested language in the first language;

invoke through the language interface the first language module to perform code generation for the computer program;

provide compilation result to one or more clients based on at least one of the analysis and the code generation.

8. The machine readable medium of claim 7 wherein:

the language interface includes functionality to request the compilation of a specified portion of the computer program using the second language module.

9. The machine readable medium of claim 8 wherein:

the programming language-dependent analysis of the computer program includes at least one of: lexical analysis, syntactic analysis, name resolution, semantic analysis, and code generation.

10. The machine readable medium of claim 8, wherein the programming language-independent portion of the compilation process includes at least one of:

managing a set of files involved in the compilation process;

persisting a set of paths involved in the compilation process;

maintaining a set of dependencies for the compilation process;

maintaining at least one namespace for storing a plurality of names used in the computer program;

acquiring configuration information; and maintaining a list of errors related to the computer program.

11. The machine readable medium of claim 8 wherein:

the computer program is written in the Java® programming language.

12. The machine readable medium of claim 8, further comprising instructions to cause the system to:

extend a second language module with the first language module in order to create a new programming language.

* * * * *

UNITED STATES PATENT AND TRADEMARK OFFICE
CERTIFICATE OF CORRECTION

PATENT NO. : 7,441,238 B2
APPLICATION NO. : 10/951315
DATED : October 21, 2008
INVENTOR(S) : Zatloukal Page 1 of 1

It is certified that error appears in the above-identified patent and that said Letters Patent is hereby corrected as shown below:

Title Page; item (56); on page 3, in column 1, under "Other Publications", line 17, delete "Var" and insert -- Van --, therefor.

On page 3, in column 2, under "Other Publications", line 22, delete "Interoperabillity" and insert -- Interoperability --, therefor.

On page 3, in column 2, under "Other Publications", line 61, delete "Van Der Alst" and insert -- Van Der Aalst --, therefor.

In column 7, line 1, in claim 1, after "the" delete "first".

In column 8, line 19, in claim 9, delete "8" and insert -- 7 --, therefor.

In column 8, line 24, in claim 10, delete "8" and insert -- 7 --, therefor.

In column 8, line 36, in claim 11, delete "8" and insert -- 7 --, therefor.

In column 8, line 39, in claim 12, delete "8" and insert -- 7 --, therefor.

Signed and Sealed this

Eleventh Day of May, 2010

David J. Kappos
*Director of the United States Patent and Trademark Office*